US009324996B2

(12) United States Patent
Nishi et al.

(10) Patent No.: US 9,324,996 B2
(45) Date of Patent: Apr. 26, 2016

(54) CARBON NANOSTRUCTURE, METAL-SUPPORTED CARBON NANOSTRUCTURE, LITHIUM-ION SECONDARY BATTERY, METHOD FOR PRODUCING CARBON NANOSTRUCTURE, AND METHOD FOR PRODUCING METAL-SUPPORTED CARBON NANOSTRUCTURE

(75) Inventors: Nobuyuki Nishi, Okazaki (JP); Norikazu Adachi, Kariya (JP); Yasuyuki Ooba, Kariya (JP); Manabu Yamada, Kariya (JP); Kenichiro Kami, Kariya (JP); Kazuhiko Mizuuchi, Kitakyushu (JP)

(73) Assignees: INTER-UNIVERSITY RESEARCH INSTITUTE CORPORATION NATIONAL INSTITUTES OF NATURAL SCIENCES, Tokyo (JP); DENSO CORPORATION, Kariya (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 339 days.

(21) Appl. No.: 13/813,817

(22) PCT Filed: Aug. 8, 2011

(86) PCT No.: PCT/JP2011/004485
§ 371 (c)(1),
(2), (4) Date: Mar. 18, 2013

(87) PCT Pub. No.: WO2012/020561
PCT Pub. Date: Feb. 16, 2012

(65) Prior Publication Data
US 2013/0181172 A1    Jul. 18, 2013

(30) Foreign Application Priority Data

Aug. 10, 2010  (JP) ................................. 2010-179686
Aug. 4, 2011  (JP) ................................. 2011-170836

(51) Int. Cl.
H01M 4/88    (2006.01)
H01M 4/133   (2010.01)
(Continued)

(52) U.S. Cl.
CPC .............. $H01M\ 4/133$ (2013.01); $H01G\ 11/36$ (2013.01); $H01M\ 4/134$ (2013.01);
(Continued)

(58) Field of Classification Search
CPC . H01G 11/24; H01G 11/26; H01M 2004/021; H01M 4/1397; H01M 4/382; B82Y 30/00; B01J 23/42; B01J 20/20
USPC ........ 252/502, 503, 182.1; 361/503; 428/368, 428/403; 429/231.4, 12, 199, 231.95; 502/172, 416
See application file for complete search history.

(56) References Cited

U.S. PATENT DOCUMENTS

2007/0270305 A1* 11/2007 Pak et al. .................... 502/172
2008/0207442 A1* 8/2008 Pfeifer et al. ................ 502/416
(Continued)

FOREIGN PATENT DOCUMENTS

JP    A-2008-77969    4/2008
JP    B2-4069465      4/2008
(Continued)

OTHER PUBLICATIONS

Magasinski et al., "High-Performance Lithium-Ion Anodes Using a Hierarchical Bottom-Up Approach," *Nature Materials*, vol. 9, 2010, pp. 353-358.
(Continued)

*Primary Examiner* — Khanh Tuan Nguyen
(74) *Attorney, Agent, or Firm* — Oliff PLC

(57) ABSTRACT

This invention provides a carbon nanostructure including: carbon containing rod-shaped materials and/or carbon containing sheet-shaped materials which are bound three-dimensionally; and graphene multilayer membrane walls which are formed in the rod-shaped materials and/or the sheet-shaped materials; wherein air-sac-like pores, which are defined by the graphene multilayer membrane walls, are formed in the rod-shaped materials and/or the sheet-shaped materials.

13 Claims, 12 Drawing Sheets

(51) Int. Cl.
*H01G 11/36* (2013.01)
*H01M 4/134* (2010.01)
*H01M 4/1395* (2010.01)
*H01M 4/62* (2006.01)
H01M 4/38 (2006.01)
H01M 10/0525 (2010.01)
H01G 11/50 (2013.01)
H01M 4/1393 (2010.01)

(52) U.S. Cl.
CPC .......... *H01M 4/1395* (2013.01); *H01M 4/626* (2013.01); *H01G 11/50* (2013.01); *H01M 4/1393* (2013.01); *H01M 4/386* (2013.01); *H01M 4/387* (2013.01); *H01M 4/625* (2013.01); *H01M 10/0525* (2013.01); *Y02E 60/122* (2013.01); *Y02E 60/13* (2013.01); *Y02P 70/54* (2015.11)

(56) References Cited

U.S. PATENT DOCUMENTS

2009/0176079 A1  7/2009  Cabrera-Perez et al.
2009/0181266 A1* 7/2009  Park et al. ................ 429/12
2009/0269667 A1* 10/2009 Antonietti et al. ........ 429/231.4
2011/0058308 A1  3/2011  Nishi et al.

FOREIGN PATENT DOCUMENTS

JP   2008-251221   * 10/2008  .............. H01M 4/58
JP   A-2009-538813   11/2009
KR   10-2009-0019870   2/2009
KR   10-2010-0095628   8/2010
WO   WO 2007/137667 A1   12/2007
WO   WO 2009/075264 A1   6/2009

OTHER PUBLICATIONS

Uehara et al., "Thick Vacuum Deposited Silicon Films Suitable for the Anode of Li-Ion Battery," *Journal of Power Sources*, vol. 146, 2005, pp. 441-444.

Kasavajjula et al., "Nano- and Bulk-Silicon-Based Insertion Anodes for Lithium-Ion Secondary Cells," *Journal of Power Sources*, vol. 163, 2007, pp. 1003-1039.

International Search Report issued in International Patent Application No. PCT/JP2011/004485 dated Nov. 1, 2011.

International Preliminary Report on Patentability issued in International Patent Application No. PCT/JP2011/004485 dated Jan. 15, 2013 (with translation).

* cited by examiner

CARBON NANOSTRUCTURE, METAL-SUPPORTED CARBON NANOSTRUCTURE, LITHIUM-ION SECONDARY BATTERY, METHOD FOR PRODUCING CARBON NANOSTRUCTURE, AND METHOD FOR PRODUCING METAL-SUPPORTED CARBON NANOSTRUCTURE

TECHNICAL FIELD

The present invention relates to a carbon nanostructure, a metal-supported carbon nanostructure, a lithium-ion secondary battery, a method for producing a carbon nanostructure and a method for producing a metal-supported carbon nanostructure.

BACKGROUND ART

Carbon materials are applied for low temperature fuel cells, electrodes of supercapacitors and lithium-ion secondary batteries or catalyst carriers in liquid-phase catalytic reaction. Therefore, the carbon material becomes important more than ever while the cost reduction for the production of the carbon materials is more and more required. In the use of the carbon materials as the electrodes or the catalyst carriers, the high porosities of the respective carbon materials are important in view of high fluidity of gas and liquid. In the use of the carbon materials as the electrodes, the high electric conductivities and current densities of the respective carbon materials are important.

As negative electrodes of lithium-ion secondary batteries which may realize respective large capacities are to be employed nanoparticles or nanotubes made of tin, silicon or the like. However, the volume expansion of metal becomes extreme large when the metal absorbs lithium so that the metal is normally broken apart and thus loses the contact to the corresponding electrode immediately, thereby lowering the electric capacity of the lithium-ion secondary battery extremely. This problem renders difficult the practical use of the lithium-ion secondary battery.

Here, silicon strictly belongs to semiconductor, but is treated as metal in this application because the silicon can exhibit half-metallic properties.

In non-patent document No. 1, in this point of view, silicon-carbon complex materials which are deposited on and bonded to the surfaces of carbon particles, each carbon particle being obtained through high temperature resolution of propylene gas, exhibit high capacity retention of 1270 mAh/cm$^3$ at 20 hour-discharging rate (C/20) and high charge/discharge efficiency of 98% or more even though the silicon-carbon complex materials are fixed to the surfaces of the carbon particles. In high current density region, however, the silicon-carbon complex materials have problems of capacity retention being remarkably reduced and the aforementioned properties such as high capacity retention and high charge/discharge efficiency being not able to be exhibited stably due to the not sufficient specific surface area thereof and the large dependency to the specific surface area from the inner spaces of the voids formed therein.

It is reported, on the other hand, that silicon crystal is heated to be vaporized and deposited in a thickness of several μm order on a concave-convex copper film in vacuum atmosphere under the state of silicon microcrystal to form the corresponding negative electrode material (non-patent document No. 2). In this case, the reduction of the charge/discharge characteristic cannot be avoided and the production cost of the negative electrode material is extremely increased (non-patent document No. 3).

In non-patent document No. 1, moreover, active material such as tin, calcium, strontium, barium, iridium or the like, which can form lithium alloy with lithium, is supported in the micropores of activated carbon to form the negative electrode of a lithium-ion secondary battery. However, the upper limited value of additive amount of the active material is only 30% relative to the carbon weight of carbon constituting the activated carbon so that the lithium-ion secondary battery using such a negative electrode cannot have sufficient charge/discharge efficiency.

Patent document No. 1: Patent Number JP4069465

Non patent document No. 1: High-performance lithium-ion anodes using a hierarchical bottom-up approach, A. Magasinski, P. Dixon, B. Hertzberg, A. Kvit, J. Ayala, and G. Yushin, Nature Materials, 9(2010)353-358

Non patent document No. 2: Thick vacuum deposited silicon films suitable for the anode of Li-ion battery, Mikiko Ueda, Junji Suzuki, Kohki Tamura, Kyoichi Sekine, Tsutomu Takamura, Journal of Power Sources, 146(2005)441-444

Non patent docment No. 3: Nano- and bulk-silicon-based insertion anodes for lithium-ion secondary cells, Uday Kasavajjula, Chunsheng Wang, and A. John Appleby, Journal of Power Sources, 163(2007)1003-1039

DISCLOSURE OF THE INVENTION

Problem to be Solved by the Invention

It is an object of the present invention to provide a new structural carbon nanostructure and metal-supported carbon nanostructure which can be used as a negative electrode material of a lithium-ion secondary battery or the like.

Technical Solution

In order to achieve the object of the present invention, the present invention relates to a carbon nanostructure including: carbon containing rod-shaped materials and/or carbon containing sheet-shaped materials which are bound three-dimensionally; and graphene multilayer membrane walls which are formed in the rod-shaped materials and/or the sheet-shaped materials; wherein air-sac-like pores, which are defined by the graphene multilayer membrane walls, are formed in the rod-shaped materials and/or the sheet-shaped materials.

The present invention also relates to a metal-supported carbon nanostructure including: a carbon nanostructure including carbon containing rod-shaped materials and/or carbon containing sheet-shaped materials which are bound three-dimensionally, and graphene multilayer membrane walls which are formed in the rod-shaped materials and/or the sheet-shaped materials, wherein air-sac-like pores, which are defined by the graphene multilayer membrane walls, are formed in the rod-shaped materials and/or the sheet-shaped materials; and a metallic material supported in the air-sac-like pores.

The carbon nanostructure of the present invention is configured such that carbon containing rod-shaped materials and/or sheet-shaped materials are bound three-dimensionally to form a carbon structure where the air-sac-like pores are formed. By supporting various materials as need arises in the air-sac-lie pores, therefore, the carbon nanostructure can be applied for various uses.

In the metal-supported carbon nanostructure, moreover, predetermined metal is supported in the air-sac-like pores. By changing the kind of metal, therefore, the metal-supported carbon nanostructure can be applied for various uses. Particularly, by setting the metal to a metallic material which is reversibly absorbable/desorbable for lithium metal, the metal-supported carbon nanostructure can be utilized as a negative electrode for a lithium-ion secondary battery.

In this manner, the carbon nanostructure and the metal-supported carbon nanostructure can be applied for the negative electrode for the lithium-ion secondary battery.

Here, the wording "nanostructure" in this invention means that the characteristic component is set in the order of several nanometers to several hundred nanometers.

Moreover, the wording "air-sac-like pore" means the state where some layers of the graphene multilayer membrane walls are branched repeatedly so that the adjacent pores are communicated one another.

The carbon nanostructure may be formed in any shape, but can be formed in network-shaped monolith if the production method as will be described hereinafter is employed so as to form the carbon nanostructure. In this case, the metal-supported carbon nanostructure is also formed in network-shaped monolith.

The carbon nanostructure and the metal-supported carbon nanostructure can be produced as follows.

Namely, the production method of the carbon nanostructure includes the steps of : blowing methyl acetylene gas into a solution containing a metallic salt to form rod-shaped crystalline materials and/or sheet-shaped crystalline materials of metallic methyl acetylide; conducting first thermal treatment for the rod-shaped crystalline materials and/or sheet-shaped crystalline materials to segregate metal of the metallic methyl acetylide and carbon of the rod-shaped crystalline materials and/or sheet-shaped crystalline materials so as to form carbon nanostructure intermediate which is configured such that carbon containing rod-shaped materials and/or sheet-shaped materials are bound three-dimensionally and then form metal encapsulated carbon nanostructure which encapsulates the metal in the carbon nanostructure intermediate; contacting the metal encapsulated carbon nanostructure with nitric acid; and conducting second thermal treatment for the metal encapsulated carbon nanostructure to blow off metal encapsulated in the metal encapsulated carbon nanostructure.

The production method of the metal-supported carbon nanostructure includes the steps of: blowing methyl acetylene gas into a solution containing a metallic salt to form rod-shaped crystalline materials and/or sheet-shaped crystalline materials of metallic methyl acetylide; conducting first thermal treatment for the rod-shaped crystalline materials and/or sheet-shaped crystalline materials to segregate metal of the metallic methyl acetylide and carbon of the rod-shaped crystalline materials and/or sheet-shaped crystalline materials so as to form a carbon nanostructure intermediate which is configured such that carbon containing rod-shaped materials and/or sheet-shaped materials are bound three-dimensionally and then form metal encapsulated carbon nanostructure which encapsulates the metal in the carbon nanostructure intermediate; contacting the metal encapsulated carbon nanostructure with nitric acid and conducting second thermal treatment for the metal encapsulated carbon nanostructure to blow off the metal encapsulated in the metal encapsulated carbon nanostructure so as to form a carbon nanostructure including carbon containing rod-shaped materials and/or carbon containing sheet-shaped materials which are bound three-dimensionally, and graphene multilayer membrane walls which are formed in the rod-shaped materials and/or the sheet-shaped materials, wherein air-sac-like pores, which are defined by the graphene multilayer membrane walls, are formed in the rod-shaped materials and/or the sheet-shaped materials; preparing a solution containing metallic chloride and mixing the carbon nanostructure with the solution so as to seal the metallic chloride in the air-sac-like pores of the carbon nanostructure through desolvating treatment; and conducting dechlorinating treatment for the metallic chloride to precipitate and support metal of the metallic chloride in the air-sac-like pores.

Advantageous Effect

According to the present invention can be provided a new structural carbon nanostructure and a metal-supported carbon nanostructure which can be used as a negative electrode of a lithium-ion secondary battery or the like.

BEST MODE FOR CARRYING OUT THE INVENTION

Hereinafter, details, other features and advantages of the present invention will be described.

(Carbon Nanostructure)

The carbon nanostructure of the present invention is configured such that carbon-containing rod-shaped materials and/or sheet-shaped materials are three-dimensionally bound and air-sac-like pores, which are defined by graphene multilayer membrane walls, are formed in the rod-shaped materials and/or the sheet-shaped materials.

Figure 1:
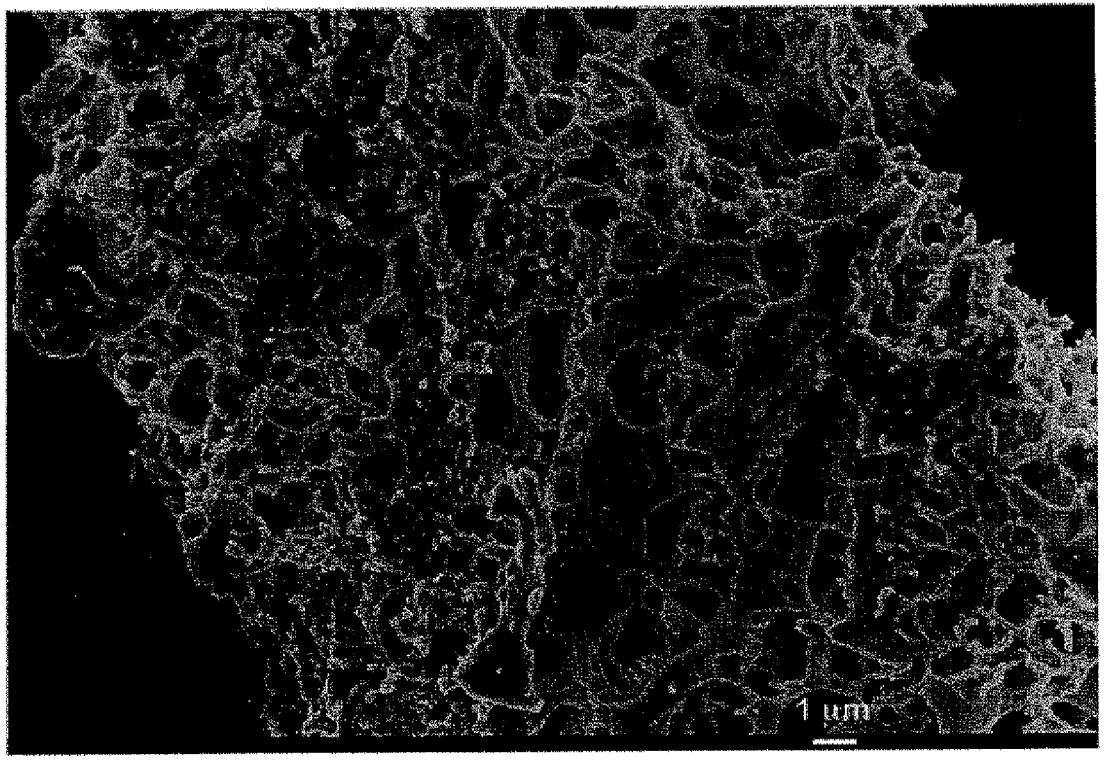
FIG. 1 is a SEM photograph of an appearance of a carbon nanostructure according to the present invention.
Figure 2:
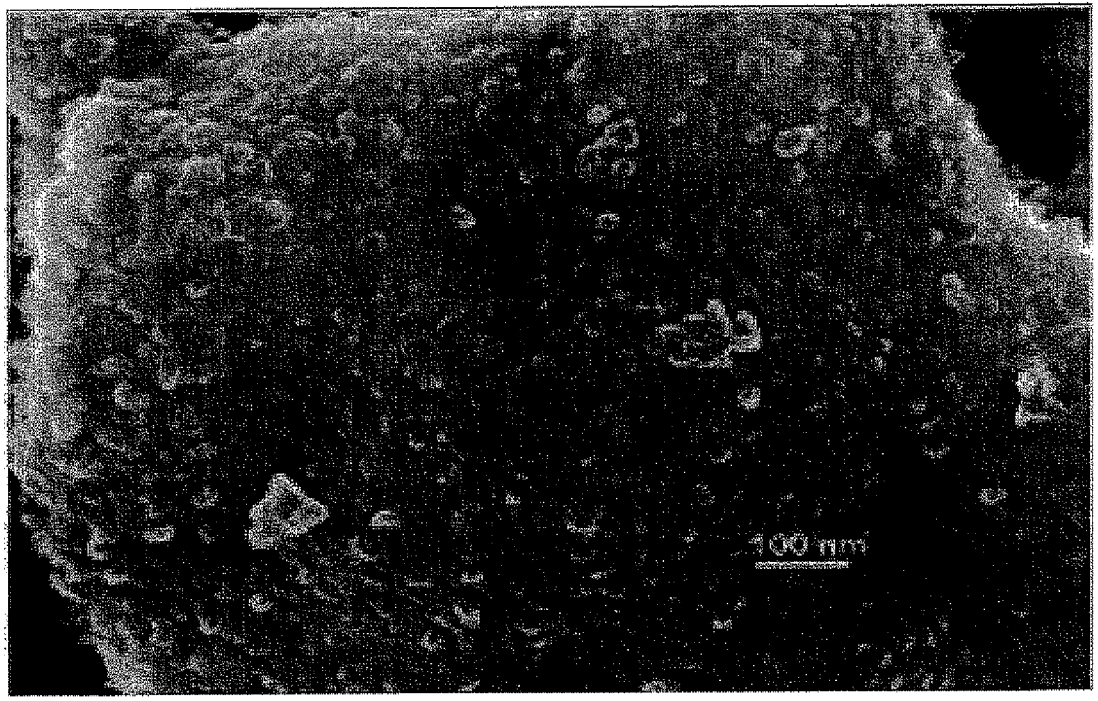
FIG. 2 is a SEM photograph showing an enlarged surface of the carbon nanostructure illustrated in FIG. 1.
Figure 3:
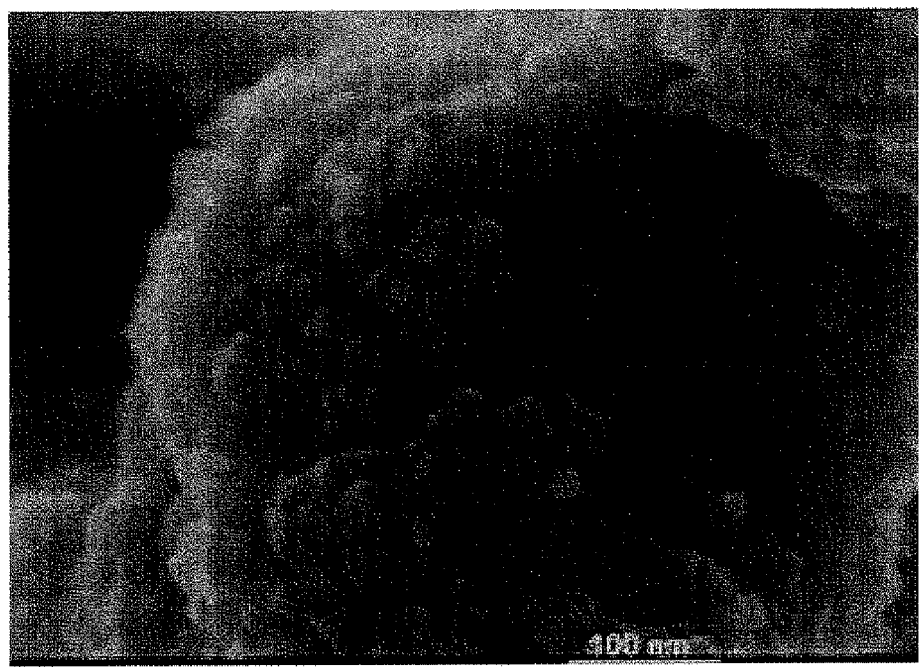
FIG. 3 is a SEM photograph showing an enlarged surface of the carbon nanostructure illustrated in FIG. 1.

FIG. 1 is a SEM photograph of an appearance of a carbon nanostructure according to the present invention, and FIGS. 2 and 3 are SEM photographs showing enlarged surfaces of the carbon nanostructure illustrated in FIG. 1, respectively.

The carbon nanostructure illustrated in FIG. 1 is formed in a shape of wisp of burned paper which is obtained from the burning and carbonization of a bundle of heavy papers, so that many pores in the order of micro-meter are randomly formed in the carbon nanostructure, thereby forming a network-structured monolith which are the three-dimensional combination of the rod-shaped materials and/or the sheet-shaped materials. As illustrated in FIGS. 2 and 3, moreover, the monolith is covered with wenny protrusions. These characteristics are originated from the production method as will be described hereinafter.

The carbon nanostructure illustrated in FIGS. 1 to 3 is only exemplified and thus can be formed in any shape by appropriately varying and changing the production method.

Figure 4:
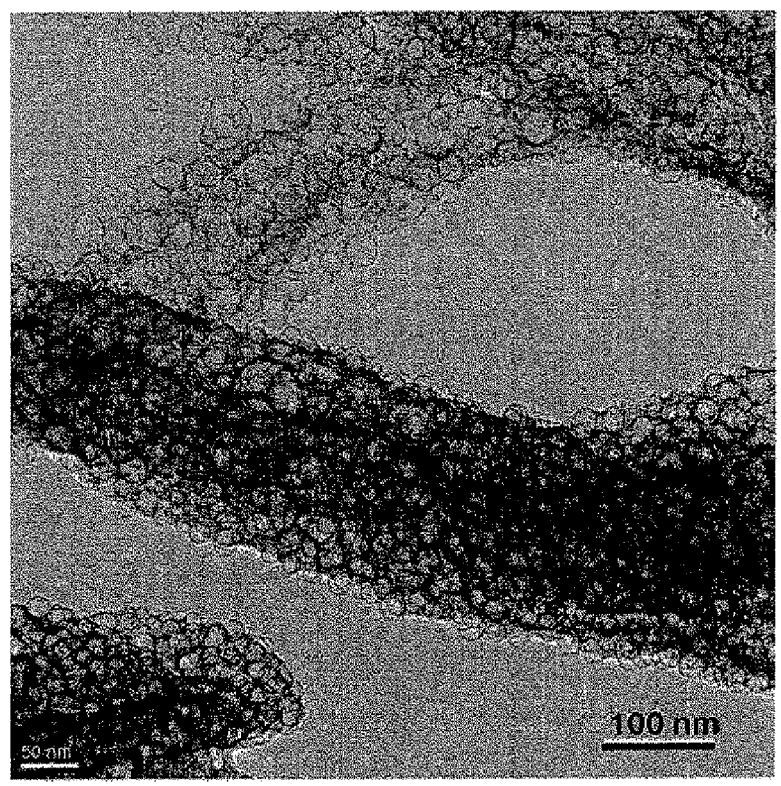
FIG. 4 is a TEM photograph showing a portion of the carbon nanostructure illustrated in FIG. 1.

FIG. 4 is a TEM photograph showing a portion of the carbon nanostructure illustrated in FIG. 1. As is apparent from FIG. 4, the carbon nanostructure has an inner area where air-sac-like pores which are communicated with one another and defined by three to ten-layered graphene multilayer membrane walls. Moreover, some layers of the graphene multilayed membrane walls are repeatedly branched so that one layer defining a pore also defines the pore adjacent to the pore already defined by the layer and thus the pores are communicated with one another.

As is apparent from FIG. 4, moreover, the pores are classified by first pores and second pores, each of the first pores being located in the skin surface of the carbon nanostructure and having a relatively smaller pore diameter within a range of 1 nm to 20 nm and each of the second pores being located in the inner area of the carbon nanostructure and having a relatively large pore diameter within a range of 10 nm to 80 nm. As will be described hereinafter, metal is mainly supported in the first pores located in the skin surfaces when the metal is supported for the carbon nanostructure.

The carbon nanostructure has a BET specific surface area of 80 $m^2/g$ or more and 300 $m^2/g$ or more according to circumstances. The BET specific surface area depends on the diameter of the rod-shaped material and/or the sheet-shaped material constituting the carbon nanostructure and the pore diameter formed in the carbon nanostructure. For example, the BET specific surface area is increased as the diameter of the rod-shaped material and/or the sheet-shaped material is decreased.

The distribution of meso space formed by the pores and the network structure can be investigated by small angle X-ray scattering spectrum, for example.

Figure 5:
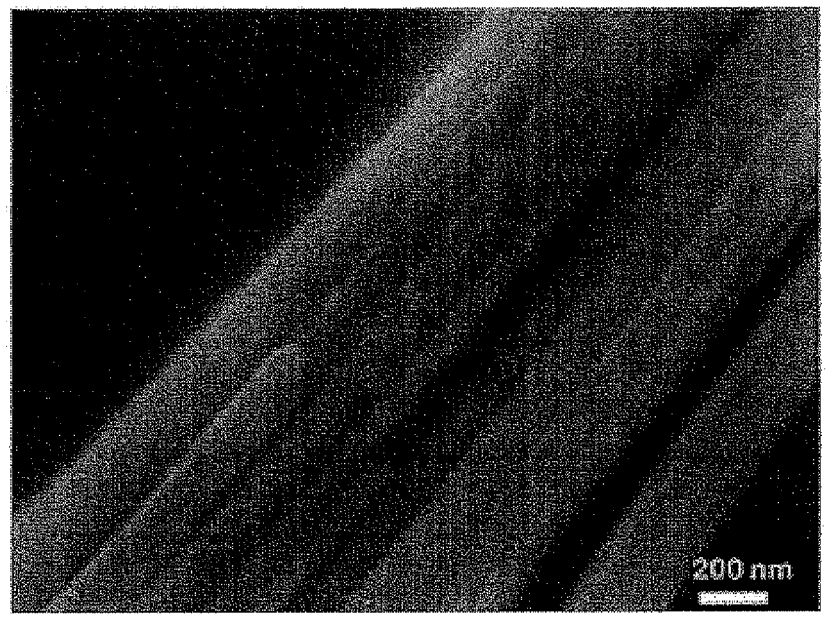
FIG. 5 is a SEM photograph showing a rod-shaped crystalline structure and/or sheet-shaped crystalline structure of copper methyl acetylide.
Figure 6:
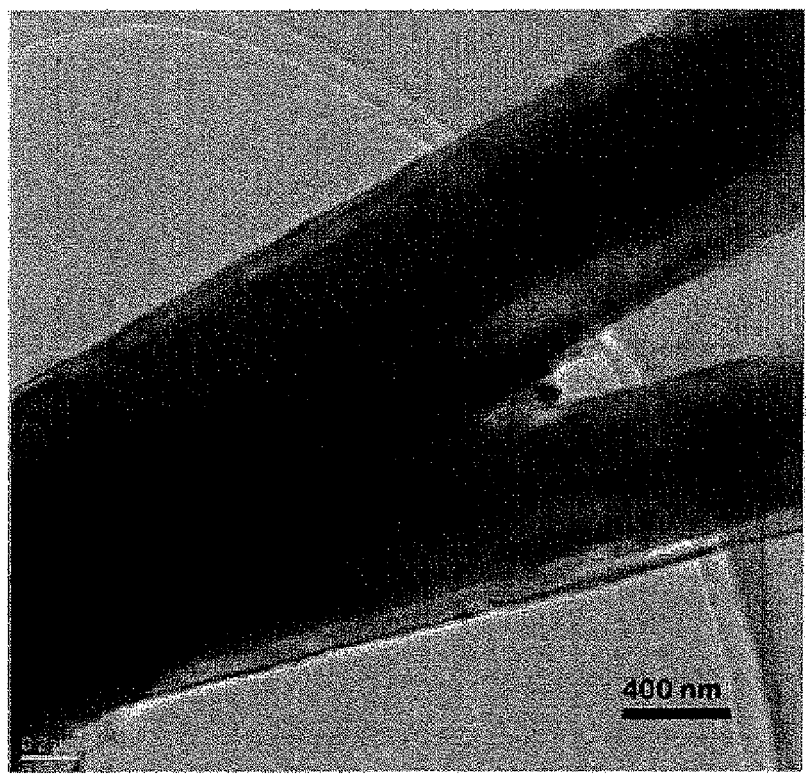
FIG. 6 is a TEM photograph showing a rod-shaped crystal structure and/or sheet-shaped crystal structure of the copper methyl acetylide.

FIGS. 5 and 6 are a SEM photograph and a TEM photograph of the rod-shaped crystalline structure and/or sheet-shaped crystalline structure of the copper methyl acetylide of the carbon nanostructure illustrated in FIG. 1. Here, the diameter of the rod-shaped material and the width of the sheet-shaped material are within a range of about 100 nm to 10 μm, respectively.

Then, the production method of the carbon nanostructure will be described. First of all, the metal encapsulated carbon nanostructure corresponding to the precursor of the carbon nanostructure is produced. The metal encapsulated carbon nanostructure can be produced below, for example.

Methylacetylene gas or a mixed gas containing methylacetylene gas is blown into an ammonia aqueous solution containing cuprous chloride under the condition that the ammonia aqueous solution is strongly agitated. In this manner, yellow rod-shaped materials and/or the sheet-shaped materials made of copper methyl acetylide are precipitated and settled down in the ammonia aqueous solution (refer to FIGS. 5 and 6).

Then, the thus obtained precipitations are transferred in a pressure resistant reactive tube made of stainless steel and introduced into a vacuum electric furnace or vacuum high temperature vessel with the reactive tube so that the precipitations are desolvated by the thermal treatment within a temperature range of 90 to 120° C. for 12 hours or more, for example. Then, hydrogen gas is introduced into the vacuum electric furnace or vacuum high temperature vessel under the condition that the pressure of the hydrogen gas is set within a range of 0.001 to 0.01 kPa therein. In this state, the precipitations are also heated at a temperature within a temperature range of 210 to 250° C. in the vacuum electric furnace or the like (first thermal treatment). After a short time, in this case, methane and ethylene are generated and the segregation reaction of carbon and copper nanoparticle occurs.

By the thermal treatment, moreover, the rod-shaped materials and/or sheet-shaped materials containing the segregated carbon are three-dimensionally bound to form the corresponding carbon nanostructure intermediate and the corresponding metal encapsulated carbon nanostructure where the copper nanoparticle obtained through the aforementioned segregation is encapsulated in the carbon nanostructure intermediate.

Here, the introduction of the hydrogen gas is to prevent the oxidation of the terminal of the carbon generated immediately from the segregation reaction as described above. By conducting the thermal treatment in the hydrogen atmosphere as described above, moreover, the segregation reaction can be conducted at a lower temperature so as to form the metal encapsulated carbon nanostructure. The generation of gas accompanied by the segregation reaction forms many pores in the metal encapsulated carbon nanostructure. Therefore, the metal encapsulated carbon nanostructure is configured as illustrated in FIG. 1 where the rod-shaped materials and/or the sheet-shaped materials are bound three-dimensionally in net-like shape to form the network monolith and many pores are formed in the monolith.

In this case, the ammonia aqueous solution containing cuprous chloride is employed in the production of the metal-encapsulated carbon nanostructure and the copper is encapsulated in the metal encapsulated carbon nanostructure as the metal to be encapsulated because the cuprous chloride can be easily prepared and adjusted as a raw material.

Here, since the metal encapsulated carbon nanostructure encapsulates a metallic material, the metal encapsulated carbon nanostructure can exhibit high electric conductivity. Therefore, the metal encapsulated carbon nanostructure can be functioned as the carbon structure (carbon material) satisfying high porosity and high electric conductivity. In this point of view, the metal encapsulated carbon nanostructure can be preferably utilized as an electrode, a catalyst-supported electrode and the like. As described above, in this case, the electric conductivity of the metal encapsulated carbon nanostructure can be more enhanced by encapsulating the copper therein.

Then, nitric acid is contacted with the metal encapsulated carbon nanostructure. Since the metal encapsulated in the metal encapsulated carbon nanostructure is strongly fixed by the carbon walls surrounding the metal, the carbon walls are dissolved by the nitric acid so that the metal can be easily and perfectly blown off by the second thermal treatment as will be described hereinafter. In this case, the residue of the metal in the void formed at the metal encapsulated carbon nanostructure after the removal of the metal, the void corresponding to the pore in the carbon nanostructure, can be prevented.

When the metal encapsulated carbon nanostructure is contacted with the nitric acid, at least the portion of the metal encapsulated in the metal encapsulated carbon nanostructure is eluted.

Moreover, the nitric acid may be diluted by water and thus obtained nitric acid aqueous solution may be used instead of the nitric acid. The contacting period of time of the nitric acid depends on the concentration of the nitric acid aqueous solution, but preferably set within a range of several ten hours.

Then, second thermal treatment is conducted to blow off (sublimation and release) the metal encapsulated in the metal-encapsulated carbon nanostructure to form the carbon nanostructure as described above. In this case, the voids formed after the blow of the metal correspond to the pores of the carbon nanostructure. The second thermal treatment is conducted within a temperature range of 900 to 1400° C. for several hours, concretely 5 to 10 hours under vacuum atmosphere, for example.

The second thermal treatment renders the carbon walls surrounding the metal in the state of graphene, contributes to the formation of the graphene multilayer membrane walls and contributes to the branching of some layers of the graphene multilayer membrane walls, thereby forming the air-sac-like pores.

The second thermal treatment may be conducted by the use of microwave. In this case, the cost of the second thermal treatment using the microwave can be reduced in comparison with the cost of the second thermal treatment using the vacuum heating treatment.

Through the aforementioned steps, the carbon nanostructure, configured such that the carbon-containing rod-shaped materials and/or sheet-shaped materials are three-dimensionally bound and the air-sac-like pores defined by the graphene multilayer membrane walls are formed in the rod-shaped materials and/or the sheet-shaped materials, can be obtained.

The structural feature of the carbon nanostructure being formed as the net-like monolith bound three-dimensionally by the rod-shaped materials and/or the sheet-shaped materials is originated from the aforementioned production method, namely that the metal encapsulated carbon nanostructure as the precursor of the carbon nanostructure has the net-like monolith.

After the metal is blown off from the metal encapsulated carbon nanostructure, the metal encapsulated carbon nanostructure is washed to dissolve and remove the remaining metal. As described above, since the air-sac-like pores of the carbon nanostructure are constituted from the voids of the metal encapsulated carbon nanostructure after the blow of the encapsulated metal, if the metal to be blown off remains in the voids, that is, the pores, the remaining metal maybe reacted with the supported metal when the metal-supported carbon nanostructure is formed by using the supported metal, thereby not forming the intended metal-supported carbon nanostructure having some intended characteristics.

As described above, however, since the metal encapsulated carbon nanostructure is washed to dissolve and remove the metal remaining in the voids, that is, the pores to be formed, the aforementioned disadvantages can be removed.

The dissolution washing may be conducted by immersing the metal encapsulated carbon nanostructure in hot nitric acid for 4 to 8 hours.

The removal of the metal remaining in the metal encapsulated carbon nanostructure can be conducted by a third thermal treatment for the metal encapsulated carbon nanostructure In this case, the third thermal treatment is conducted within a temperature range of 500 to 1400° C. so as to remove the remaining carbon from the carbon materials.

The dissolution washing and the third thermal treatment may be employed independently or in combination.

(Metal-Supported Carbon Nanostructure)

The metal-supported carbon nanostructure of the present invention is configured such that a prescribed metallic material is supported in the air-sac-like pores, mainly first pores with the small pore diameter in the carbon nanostructure formed as described above.

The metallic material can be determined dependent on the intended use of the metal-supported carbon nanostructure, but if the metal-supported carbon nanostructure is employed as a negative electrode of a lithium-ion secondary battery, may be a reversibly absorbable-desorbable metallic material selected from the group consisting of Si, Ge, Sn, In, Sb and Zn for metallic lithium. Here, silicon strictly belongs to semiconductor, but is treated as metal in this application because the silicon can exhibit half-metallic properties.

If lithium-transition metallic material, phosphorous oxide material or lithium sulfide is supported instead of the aforementioned metallic materials, the metal-supported carbon nanostructure can be employed as a positive electrode material of the lithium-ion secondary battery.

It is desired that the metallic material is not supported in all of the pores of the carbon nanostructure, but is supported in some of the pores so that the pores can remain as they are with not supported by the metallic material. In the case that the metal-supported carbon nanostructure is employed as the negative electrode of the lithium-ion secondary battery, if the supported metal absorbs lithium, the volume of the supported metal is expanded three to four times as large as it is so that the supported metal cannot absorbs lithium any more and thus the metal-supported carbon nanostructure cannot function as the negative electrode sufficiently because the infiltration of lithium into the negative electrode is prevented. On the other hand, if the pores remain as they are with not supported by the metallic material, the pores functions as cushion for the expansion of the metallic material so that the negative electrode cannot be broken and the infiltrating path of lithium ion for the negative electrode can be ensured. As a result, the negative electrode can exhibit the inherent function.

Then, the production method of the metal-supported carbon nanostructure will be described. First of all, after the carbon nanostructure is produced as described above, metallic chloride is dissolved in a solvent to blend a solution containing the metallic chloride. Then, the carbon nanostructure is mixed with the solution and the metallic chloride is infiltrated into the pores of the carbon nanostructure after desolvation treatment is conducted for the pores of the carbon nanostructure. Then, dechlorination treatment is conducted for the metallic chloride so as to precipitate and support the metallic material of the metallic chloride in the pores of the carbon nanostructure.

For example, in the case that tin is supported for the carbon nanostructure, tin chloride is dissolved in tetrahydrofuran by an amount thereof almost equal to the volume of all of the air-sac-like pores of the carbon nanostructure and the thus obtained solution is mixed with the carbon nanostructure. Then, boiling treatment is conducted for the thus obtained mixture so as to close the tin chloride (crystal) in the pores of the carbon nanostructure through boiling desolvation. The carbon nanostructure may be washed by an extremely small amount of tetrahydrofuran after the close of the tin chloride so as to dissolve and remove the tin chloride adhered on the external surface of the carbon nanostructure.

Then, when the carbon nanostructure is reduced with a strong reducing agent such as lithium aromatic complex or sodium aromatic complex, dechlorination is caused so that only tin is supported in the air-sac-like pores of the carbon nanostructure.

In the case that the tin is supported, if the supporting configuration is inadequate, the crystal of the tin is increased so as to decrease the electric capacity thereof. Therefore, the boundary distance between the adjacent tin crystals is preferably decreased up to a prescribed size. In this point of view, the copper chloride is dissolved in acetonitrile by a tithe equivalent weight of the tin chloride to blend the acetonitrile solution which is added to the tetrahydrofuran solution containing the tin chloride to cause coprecipitation. Then, boiling desolvation and dechlorination are conducted for the coprecipitation so that the boundary of the tin crystal is formed of the tin-copper alloy using the copper originated from the copper chloride. As a result, the growth of the tin crystal can be prevented. It is important that the reaction temperature in the coprecipitation is set to 0° C. or less. In this case, the excellent electric capacity and cycling characteristic can be obtained from the metal-supported carbon nanostructure.

In the case that silicon is supported, silicon chloride liquid such as $SiCl_4$ is mixed with the carbon nanostructure so that the silicon chloride liquid is infiltrated into the pores of the carbon nanostructure, and the carbon nanostructure is reduced by a strong reducing agent such as lithium aromatic complex or sodium aromatic complex to cause dechlorination reaction. As a result, only silicon is supported in the air-sac-like pores of the carbon nanostructure.

(Lithium-Ion Secondary Battery)

Then, the lithium-ion secondary battery of the present invention will be concretely described. The lithium-ion secondary battery is a so-called nonaqueous electrolyte lithium-ion secondary battery and configured as a conventional one except that the negative electrode active material is made of the carbon nanostructure and the metal-supported carbon nanostructure as described above. Namely, the lithium-ion secondary battery has a negative electrode for nonaqueous electrolyte second battery, a positive electrode, a nonaqueous electrolytic solution containing lithium ion and a separator intervening between the negative electrode and the positive electrode.

The positive electrode can be formed by suspending a positive electrode composite material made of a positive electrode active material, a conducting agent and a binding agent in a predetermined solvent and mixing the thus obtained suspension to form a slurry which is coated and dried on one side or both sides of a current collector.

As the positive active material can be exemplified various oxides, sulfides, lithium-containing oxides and conductive polymers. For example, $MnO_2$, $TiS_2$, $TiS_3$, $MoS_3$, $FeS_2$, $Li_{1-x}MnO_4$, $Li_{1-x}Mn_2O_4$, $Li_{1-x}MnPO_4$, $Li_{1-x}FeO_2$, $Li_{1-x}Ni_{1/3}Co_{1/3}Mn_{1/3}O_2$, $LiV_2O_3$, $V_2O_5$, S, polyaniline, polyparaphenylene, polyphenylene sulfide, polyphenylene oxide, polythiophene, polypyrrole can be exemplified. Here, the symbol "x" designates a number from 0 to 1.

The exemplified lithium-metallic composite oxide may be employed singly or in mixture of two kinds or more thereof. Among them, a layer-structured or spinel lithium-manganese containing composite oxide, lithium-nickel containing composite oxide, lithium-cobalt containing composite oxide and olivine $LiFePO_4$ are desired.

The examples of carbon black such as acetylene black, Ketjen Black and amorphous carbon such as needle coke are included as the conducting agent, but are not limited. Moreover, the carbon nanostructure may be employed as the conducting agent.

The examples PVDF, ethylene-propylene-diene copolymer (EPDM), SBR, acrylonitrile-butadiene rubber (NBR) and fluororubber are included as the binding agent, but are not limited.

As the solvent where the positive electrode active material is dispersed can be normally used an organic solvent which can dissolve the binding agent. Concretely, the examples of NMP, dimethylformamide, methyl ethyl ketone, cyclohexane, methyl acetate, methyl acrylate, diethyl triamine, N—N-dimethylaminopropylamine, ethylene oxide and tetrahydrofuran are included, but are not limited. Moreover, a dispersing agent, a thickening agent and PTFE are added in water so that the active material is rendered in the state of slurry.

The nonaqueous electrolytic solution can be prepared in the same manner as a conventional one except that lithium ion is contained therein. Namely, a conventionally well known nonaqueous electrolytic solution can be employed. Such a nonaqueous electrolytic solution can be prepared by dissolving a nonaqueous electrolyte in an organic solvent.

The organic solvent is not restricted only if the organic solvent can be normally used as an electrolytic solution for the lithium-ion secondary battery. For example, carbonate group, halogenated hydrocarbon, ether group, ketone group, nitrile group, lactone group, oxolane compound may be exemplified. Particularly, propylene carbonate, ethylene carbonate, 1,2-dimethoxyethane, dimethyl carbonate, diethyl carbonate, methyl ethyl carbonate, vinylene carbonate and a mixture of two kinds or more thereof are desired. Among the exemplified nonaqueous solvent, if at least one of the carbonate group and the ether group is particularly selected, the dissolution, dielectric constant and viscosity of the electrolytic solution can be rendered excellent and the charge/discharge efficiency of the lithium-ion secondary battery can be preferably enhanced.

The nonaqueous electrolyte is not restricted, but $LiPF_6$, $LiBF_4$, $LiClO_4$, $LiAsF_6$, a derivative thereof (which are inorganic salts), $Li_3SO_3CF_3$, $LiC(SO_3CF_3)_3$, $LiN(SO_2CF_3)_2$, $LiN(CF_3C_2F_5)_2$ $LiN(SO_2CF_3)(SO_2C_4F_9)$ and a derivative thereof (which are organic salts) may be exemplified. The exemplified nonaqueous electrolyte can enhance the performance of the lithium-ion secondary battery and maintain the performance thereof within a temperature range except room temperature. The concentration of the nonaqueous electrolytic solution is not restricted, but the kinds of the nonaqueous electrolyte and the organic solvent can be appropriately selected as need arises.

The separator functions as electrically insulating the positive electrode and the negative electrode and supporting the electrolytic solution. For example, a porous synthetic resin porous film, particularly, a polyolefin (polyethylene, polypropylene) porous film may be used as the separator. The size of the separator is preferably set larger than the sizes of the positive electrode and the negative electrode because the separator electrically insulates the positive electrode and the negative electrode.

The nonaqueous electrolyte secondary battery includes other necessary components except the aforementioned components.

The configuration of the nonaqueous electrolyte secondary battery is not restricted and may be formed in a shape of coin, cylinder, rectangle or the like.

EXAMPLE

[Carbon Nanostructure]

Example 1

First of all, an ammonia aqueous solution (5.5%) containing 0.1 mol/L of cuprous chloride was prepared in a flask and 1L of 10%-methyl acetylene gas diluted by nitrogen gas was blown to the ammonia aqueous solution from the bottom of the flask at a rate of 200 mL/min for about 120 minutes while the ammonia aqueous solution was agitated. Thereby, rod-shaped crystalline materials and/or sheet-shaped crystalline materials made of copper methyl acetylide started to be formed and precipitated in the ammonium aqueous solution.

Then, the thus obtained precipitate was filtered with a membrane filter while the precipitate was washed with methanol during the filtration thereof. If the reaction period of time is elongated, the length of the precipitation can be increased up to several hundred μm. This operation was repeated six times so as to obtain 50 g of yellow wired crystal hydrate precipitation.

Then, 50 g of the yellow wired crystal hydrate precipitation was put into a thick beaker with a volume of 300 ml and then also put into another thick beaker with a volume of 3L and lid with four Teflon (registered trade mark)plates, each having a thickness of 10 mm, by disposing them on the opening of the latter beaker so that a small air hole can be formed at the opening of the latter beaker. Then, the yellow wired crystal hydrate was a stainless vacuum container having an inner diameter of 155 mm, a length of 300 mm and a thickness of 5 mm with the aforementioned beakers and the interior of the vacuum container was depressurized up to 100 Pa or less. In this state, 1 L of hydrogen gas was introduced so that the interior pressure of the vacuum container is set to 0.3 μatms, and then heated up to 250° C. for 30 minutes.

In this case, the pressure in the vacuum container was gradually increased initially and then rapidly increased 2 to 3 hours later. Then, the vacuum container was cooled down to form the corresponding metal-supported carbon nanostructure of about 20 g in the vacuum container.

Then, 20 g of the metal encapsulated carbon nanostructure was put in an Erlenmeyer flask with a volume of 1 L and 400 mL of 30 to 40 wt % nitric aqueous solution was added. In this case, the carbon nanostructure was shrunk while red-brown nitrogen dioxide gas was generated and the copper remaining in the metal encapsulated carbon nanostructure was dissolved. The metal encapsulated carbon nanostructure was also heated at a temperature of about 60° C. for about 30 to 40 hours so as to enhance the copper dissolution and oxidize the unstable carbon.

The metal encapsulated carbon nanostructure was filtered, sufficiently dried and heated at a temperature of 1100° C. for 12 hours in a quartz tube. Soon after the thermal treatment, organic films were deposited on the wall of the low temperature region of the quartz tube and copper film was sublimated and deposited on the wall of the quartz tube. The organic films were taken out of the quartz tube and dissolved by hot sulfuric acid. The thus obtained dissolved material was dried and heated at a temperature of 1400° C. for 10 hours in a Tammann tube.

Figure 7:
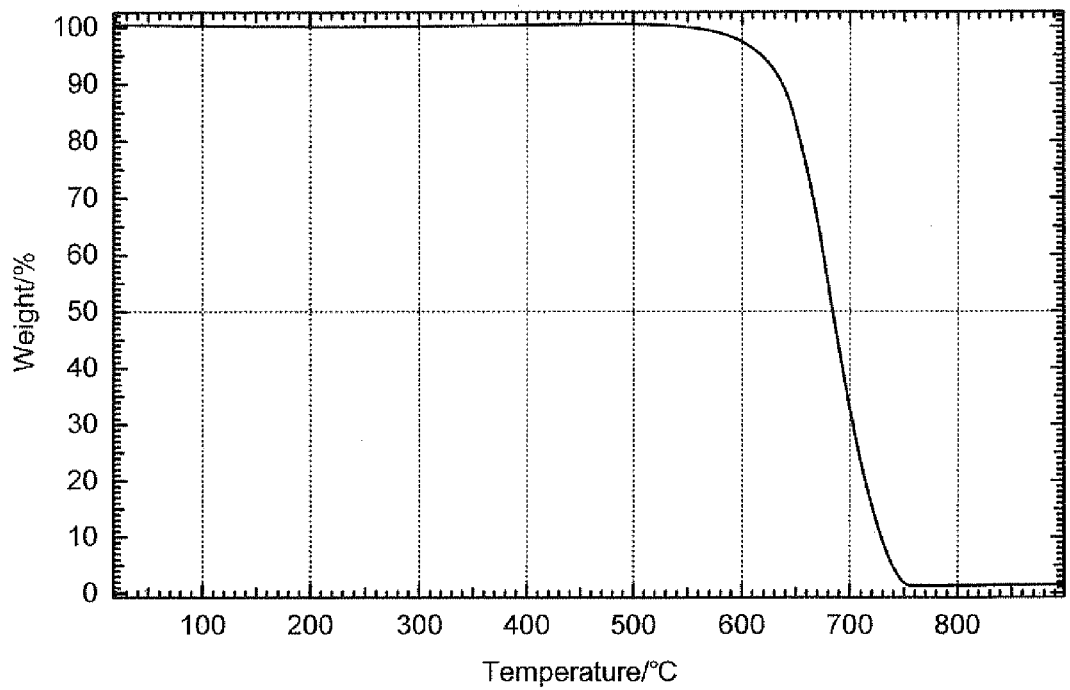
FIG. 7 is a graph showing the result of TGA (thermogravimetric analysis) of a carbon nanostructure in Examples.
Figure 8:
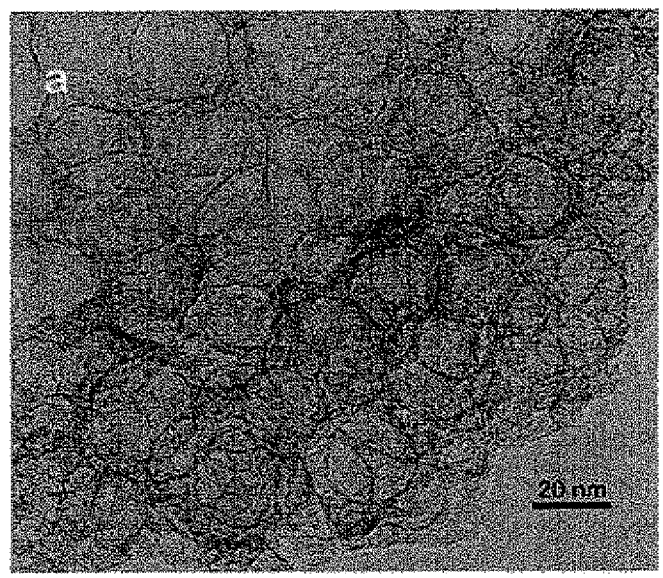
FIG. 8 is a TEM photograph of a carbon nanostructure in Examples
Figure 8:
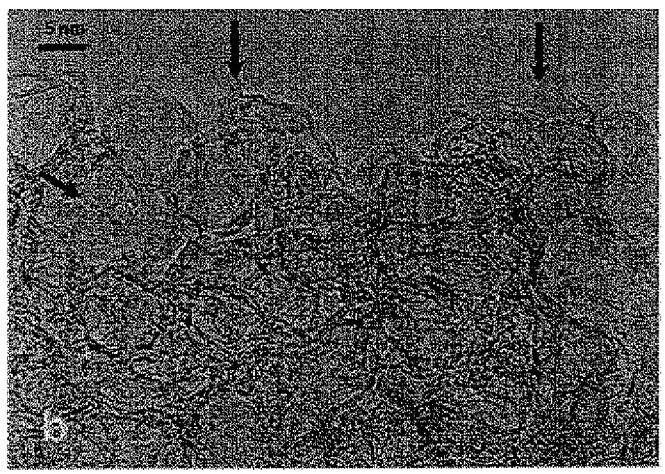
Figure 8:
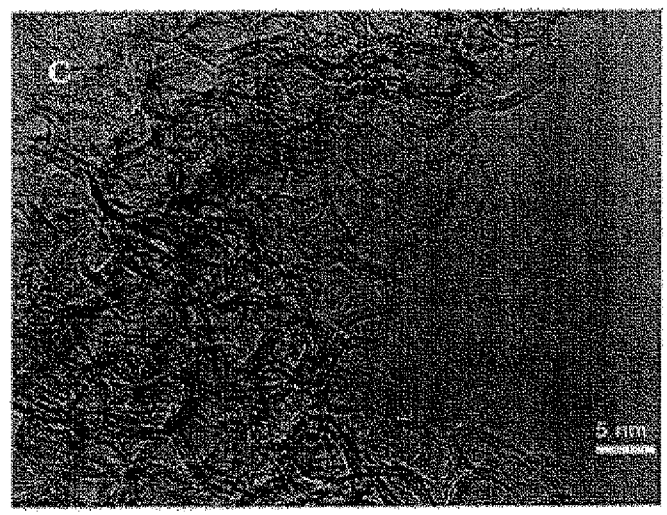
Figure 9:
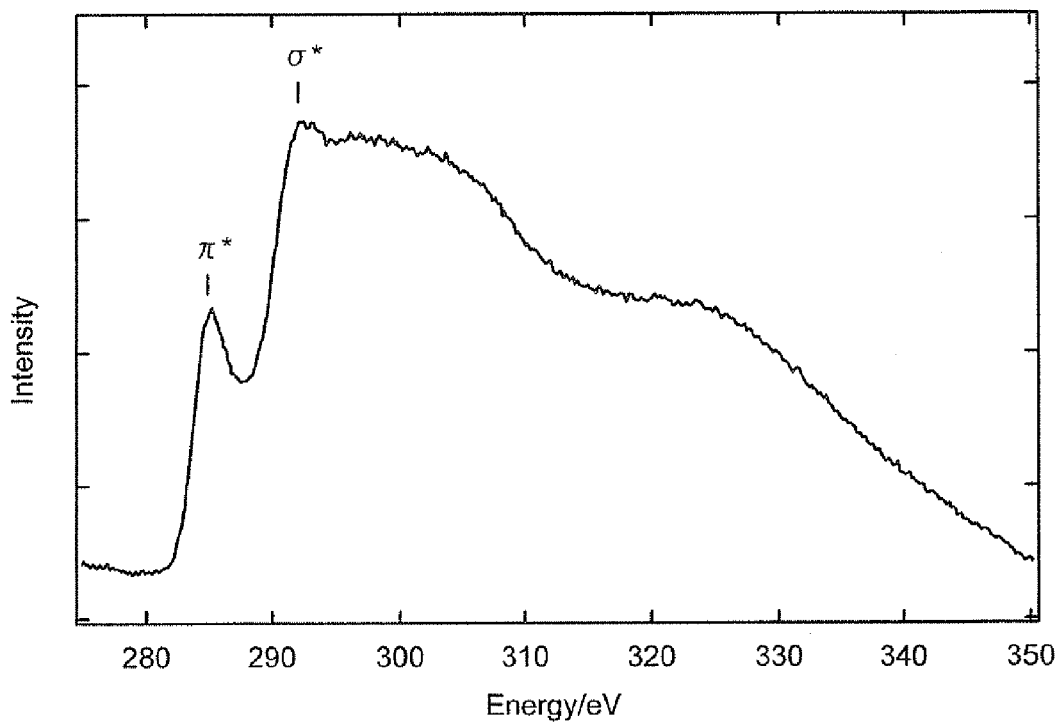
FIG. 9 is a graph showing the electron energy loss spectrum of the carbon nanostructure in Examples.
Figure 10:
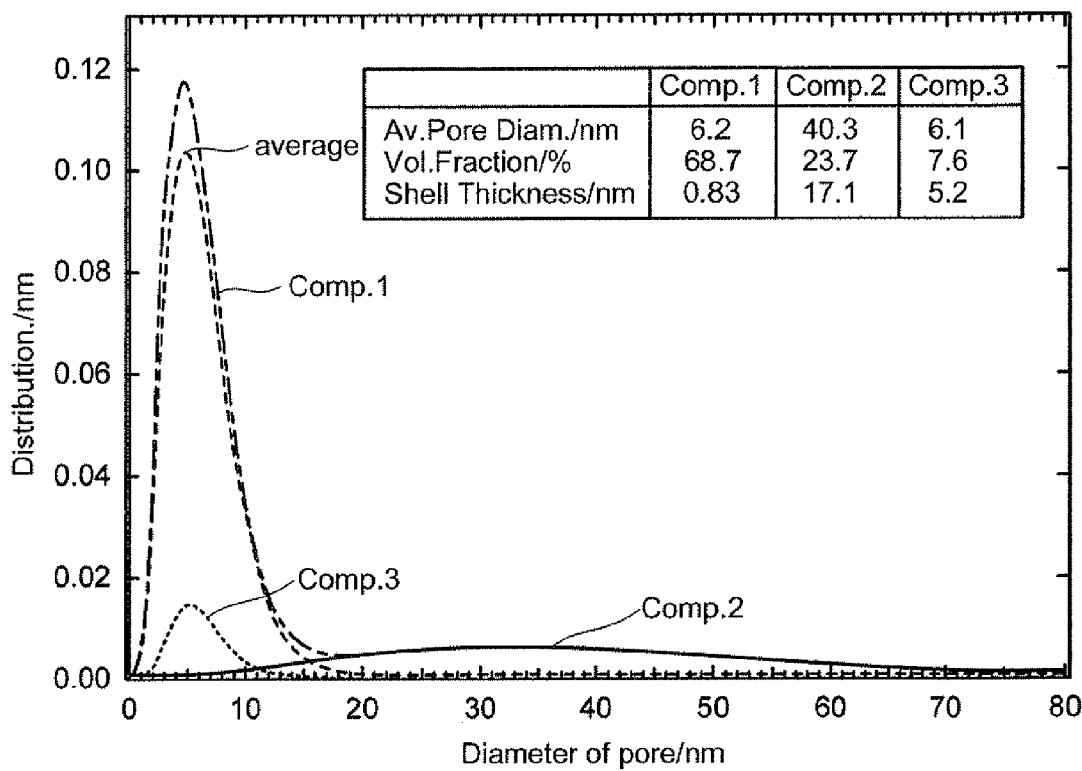
FIG. 10 is a graph showing the vacancy distribution (vacancy volume) obtained from small angle X-ray scattering spectrum of the carbon nanostructure in Examples.
Figure 11:
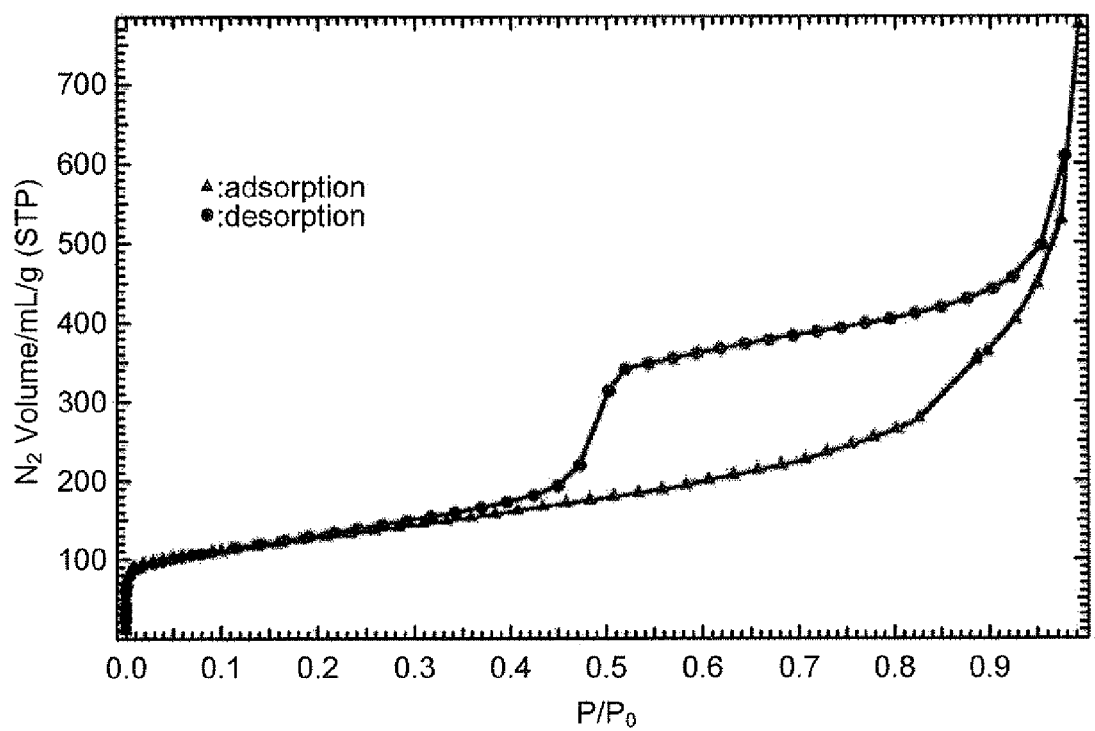
FIG. 11 is a graph showing the adsorption/desorption curves for nitrogen of the carbon nanostructure in Examples.

At this stage, when TGA (thermogravimetric analysis) was conducted for the carbon nanostructure, the graph illustrated in FIG. 7 was obtained. FIG. 7 shows that the combustion temperature was 680° C. near the combustion temperature of graphite and the remaining metal was 2 wt % or less. FIG. 8 is a TEM photograph of the carbon nanostructure and FIG. 9 is a graph showing the electron energy loss spectrum of the carbon nanostructure. FIG. 10 is a graph showing the vacancy distribution (vacancy volume) obtained from small angle X-ray scattering spectrum of the carbon nanostructure and FIG. 11 is a graph showing the adsorption/desorption curves for nitrogen of the carbon nanostructure. As is apparent from FIG. 10, there are many small pores with a pore diameter of about 6 nm in the vicinity of the surface of the carbon nanostructure (Comp. 1 and 3) and there are many large pores with a pore diameter of about 40 nm in the inner region of the carbon nanostructure (Comp. 2). The BET specific surface area was 300 $m^2$/g from the adsorption/desorption curves in FIG. 11.

Example 2

In Example 1, the carbon nanostructure encapsulating copper nanoparticle was treated with nitric aqueous solution so as to remove copper and enlarge the binding portion of the adjacent pores. In this Example, microwave heating was conducted instead of the vacuum heating of 1100° C. The heating period of time was set less than 2 hours which is enough to conduct the same heating treatment as the vacuum heating treatment. In the nitric aqueous solution treatment, the adjacent pores were bound one another to form large pores with an average diameter of 40 nm.

Example 3

Support of Tin in Pore, No. 1

Then, 1 g of the carbon nanostructure obtained in Examples 1 and 2 was dissolved in 50 ml of tetrahydrofuran solution containing 5 g of tin chloride, boiled and distilled in a separable round bottom flask with a condenser tube bulb at a temperature of 90° C. for 4 hours to substitute the air in the pores of the carbon nanostructure with the tetrahydrofuran solution. Subsequently, the condenser was positioned laterally to conduct solvent distillation. When the solvent was almost evaporated, the solid material in the round bottom flask was filtered and washed with the tetrahydrofuran solution by the half volume thereof through the dropping of the tetrahydrofuran solution so as to remove the tin chloride adhered with the outer surface of the carbon nanostructure.

Then, the carbon nanostructure encapsulating the tin chloride was reduced by a tetrahydrofuran solution containing 2M-$Li^+$.biphenyl$^-$ at a temperature of 0° C. Then, the solution containing the carbon nanostructure was washed by tetrahydrofuran at room temperature, and washed by N,N'-dimethylformamide at a temperature of 90° C. so as to remove lithium chloride and biphenyl. As a result, supporting ratio of 60% or more was able to be realized.

Figure 12:
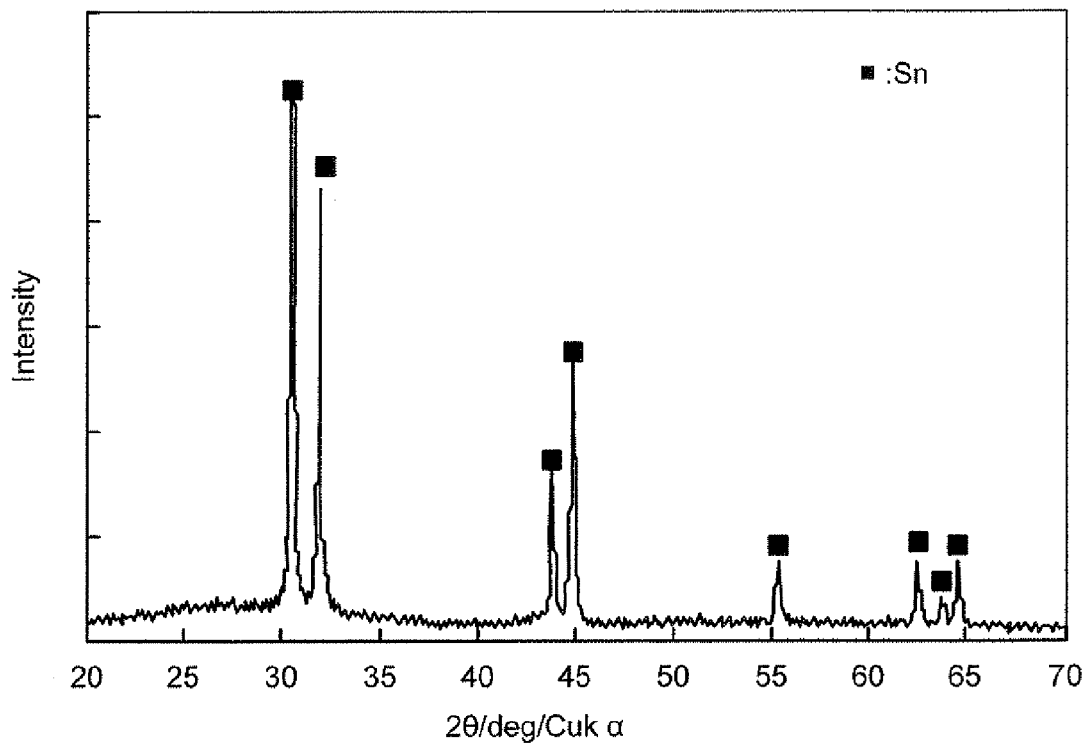
FIG. 12 is an X-ray diffraction spectrum of a tin-supported carbon nanostructure in Examples.

FIG. 12 is an X-ray diffraction spectrum of a tin-supported carbon nanostructure in this Example. As is apparent from FIG. 12, it is confirmed that the peaks relating to tin (Sn) are recognized. Therefore, the tin supported in the pores forms no tin compound and exists as it is, which means the tin is singly supported in the pores.

Figure 13:
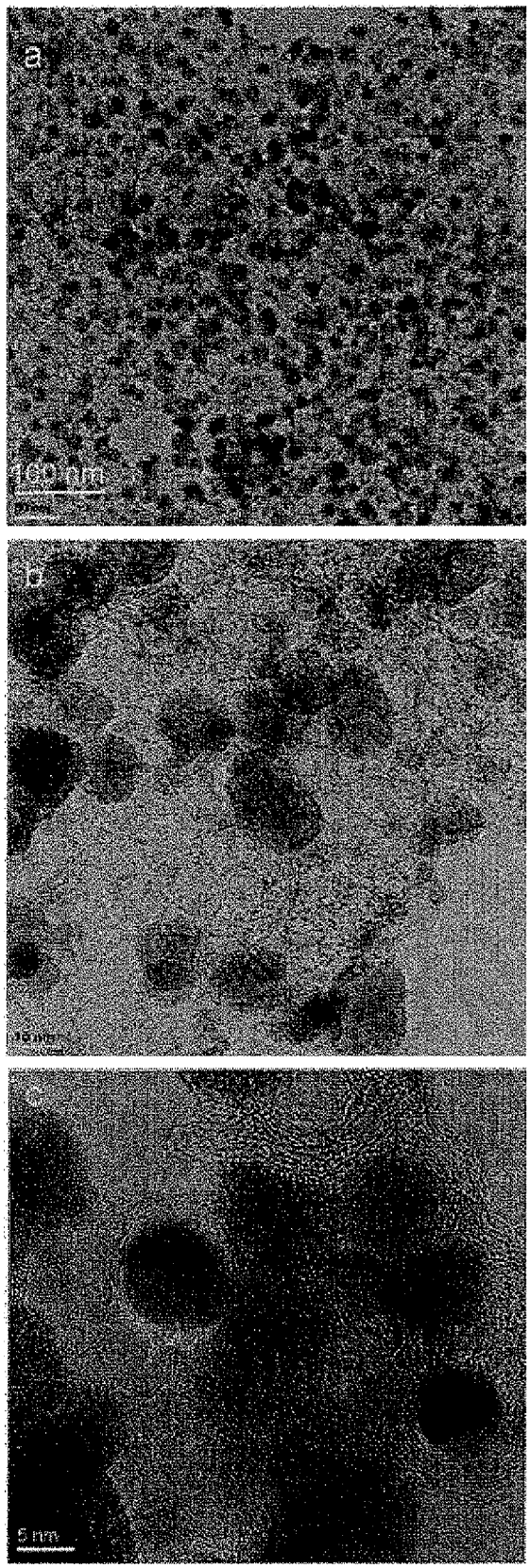
FIG. 13 is a TEM photograph of the tin-supported carbon nanostructure in Examples.

FIG. 13 is a TEM photograph of the tin-supported carbon nanostructure in this Example. As is apparent from FIG. 13, tin is not infiltrated into all of the pores so that some pores remain as they are in view of the contrasting density of the photograph. Therefore, even though the tin-supported carbon nanostructure is employed as the negative electrode material of the lithium-ion secondary battery, the remaining pores function as cushion for the expansion of the tin which absorbs lithium ion so that the negative electrode material is not broken and the fluidity of the lithium ion can be ensured, thereby enhancing the performance of the lithium-ion secondary battery.

Example 4

Support of Tin in Pore, No. 2

The carbon nanostructure encapsulating the tin chloride was prepared in the same manner as the aforementioned Example, but a tetrahydofuran solution containing 1M-lithium triethylborohydride (trade name: Superhydride) was used as a reducing agent. The reducing reaction was conducted at room temperature under argon atmosphere. In this case, the reducing reaction was able to be conducted efficiently and effectively while some gases were remarkably generated. As a result, supporting ratio of 60% or more was able to be realized as in Example 3.

Example 5

Charge/Discharge Characteristic of Tin-Supported Negative Electrode

First of all, 85 parts by mass of the tin-supported carbon nanostructure (negative electrode active material), 5 part by mass of Ketjen Black (conducting agent) and 10 parts by mass of PVDF (binder) were prepared and dispersed in NMP to form a slurry. The thus obtained slurry was coated in a weight of 5.0 mg and a diameter of 14 mm on an electrolytic copper foil with a thickness of 18 μm, dried and press-molded to form a negative electrode plate. Then, the negative electrode plate was punched out by a circular punch with a diameter of 14 mm, and dried at a temperature of 120° C. for 6 hours under vacuum atmosphere to form a negative electrode.

Then, the metallic lithium as the positive electrode (opposite electrode) and the electrolytic solution made by dissolving $LiPF_6$ at a concentration of 1 mol/L into the mixed solvent made of ethylene carbonate (EC) of 30 vol % and diethyl carbonate (DEC) of 70 vol % were prepared in addition to the negative electrode, and the intended coin nonaqueous electrolytic lithium-ion secondary battery (CR2025 type) was fabricated in a dry box. The fabrication of the battery was conducted by laminating the positive electrode and the negative electrode via a polypropylene separator, closing and sealing them with the electrolytic solution.

As the evaluation for the lithium-ion secondary battery, the initial discharge capacity and the latter discharge capacity after the cyclic charging/discharging process were measured.

The measurement of the initial discharge capacity was conducted as follows: Namely, constant-current charge was conducted up to 0.01 V and constant-voltage charge was conducted up to 10 μA or less while constant-current discharge was conducted up to 3.0 V. The cyclic charging/discharging process was conducted in the same manner as described above per cycle.

Figure 14:
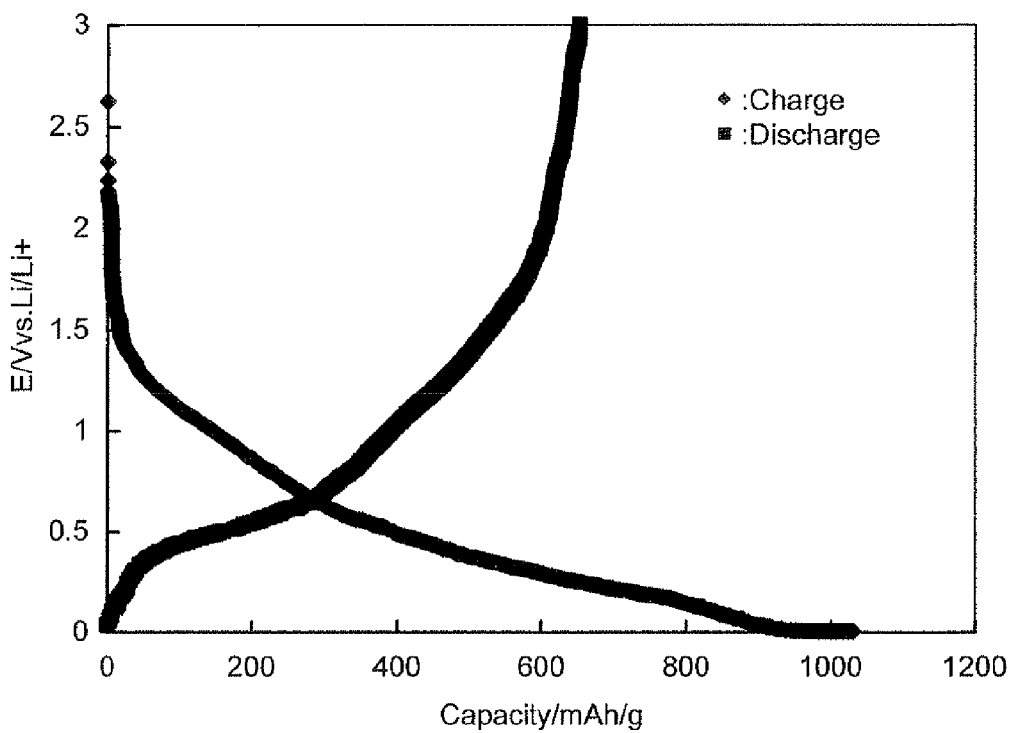
FIG. 14 is a charge/discharge curve of a lithium-ion battery in Example.
Figure 15:
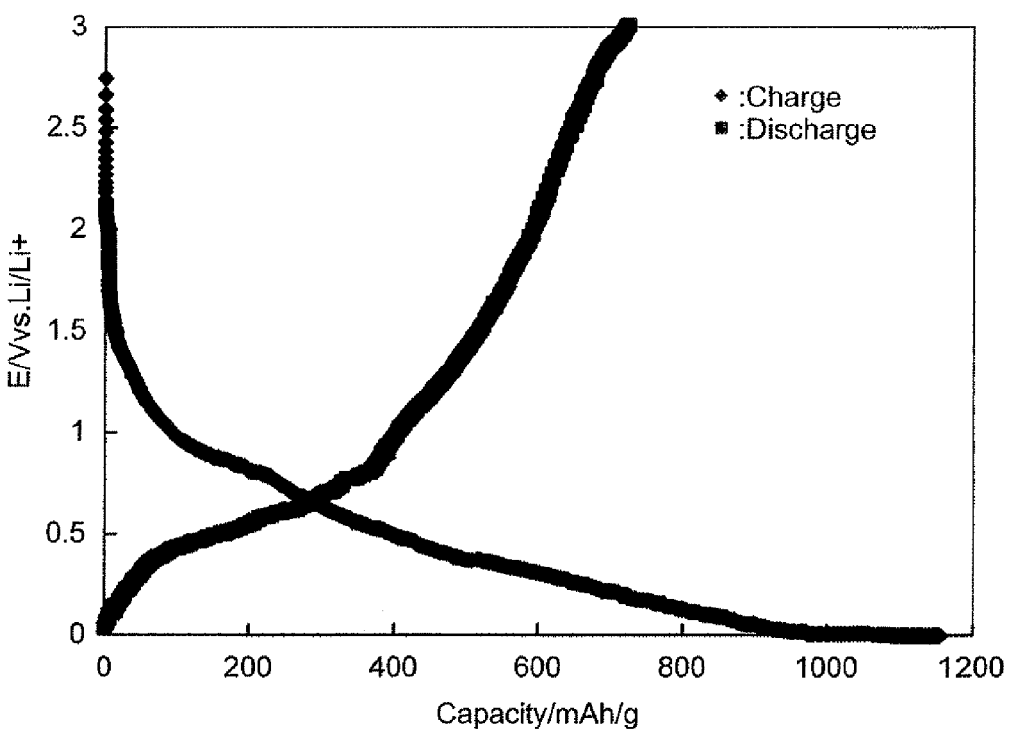
FIG. 15 is a charge/discharge curve of the lithium-ion battery in Example.

FIG. 14 is a charge/discharge curve of the lithium-ion battery having the negative electrode made of the 64.5 mass % tin nanoparticle-supported air-sac-like carbon nanostructure and the opposite electrode made of a lithium disc. FIG. 15 is a charge/discharge curve of the lithium-ion battery having the negative electrode made of the 64.5 mass % tin nanoparticle and 5 mass % copper-supported air-sac-like carbon nanostructure and the opposite electrode made of a lithium disc.

It is turned out that the initial discharge capacity, which is estimated from FIG. 14, is 654 mAh/g and the initial discharge capacity, which is estimated from FIG. 15, is 722 mAh/g. Therefore, the lithium-ion secondary battery containing the aforementioned negative electrode can exhibit high capacity retention in comparison with the initial discharge capacity (372 mAh/g) of the lithium-ion secondary battery containing the negative electrode made of the carbon nanostructure.

Figure 16:
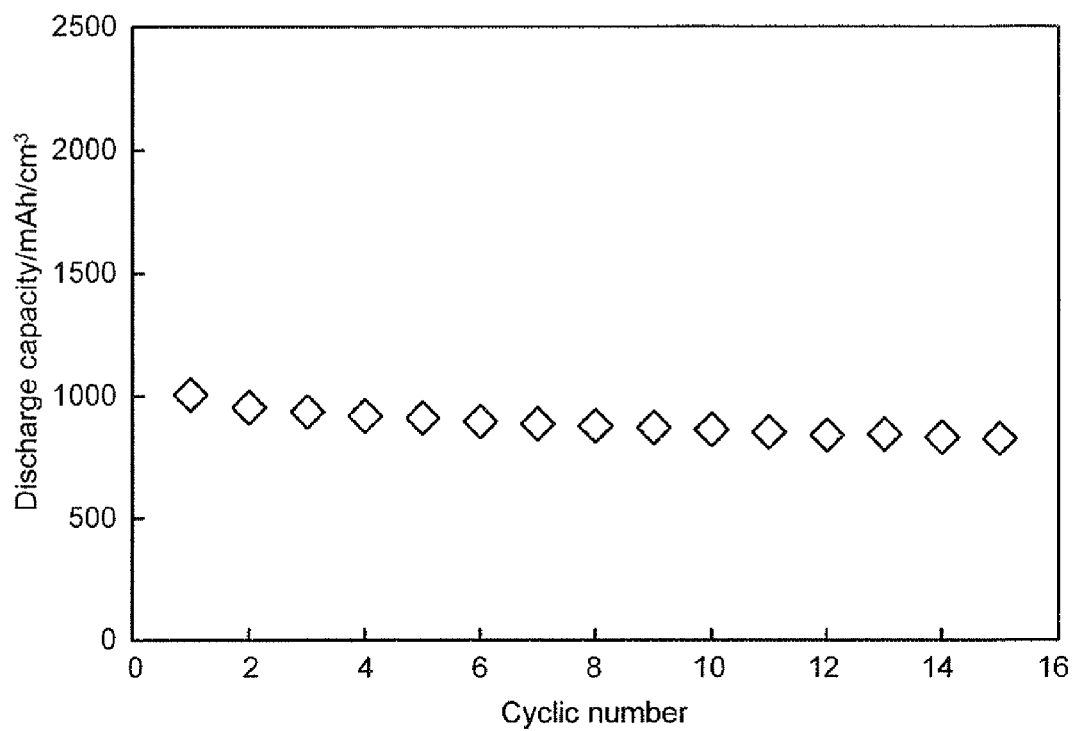
FIG. 16 is a cycling characteristic of the lithium-ion battery in Example.
Figure 17:
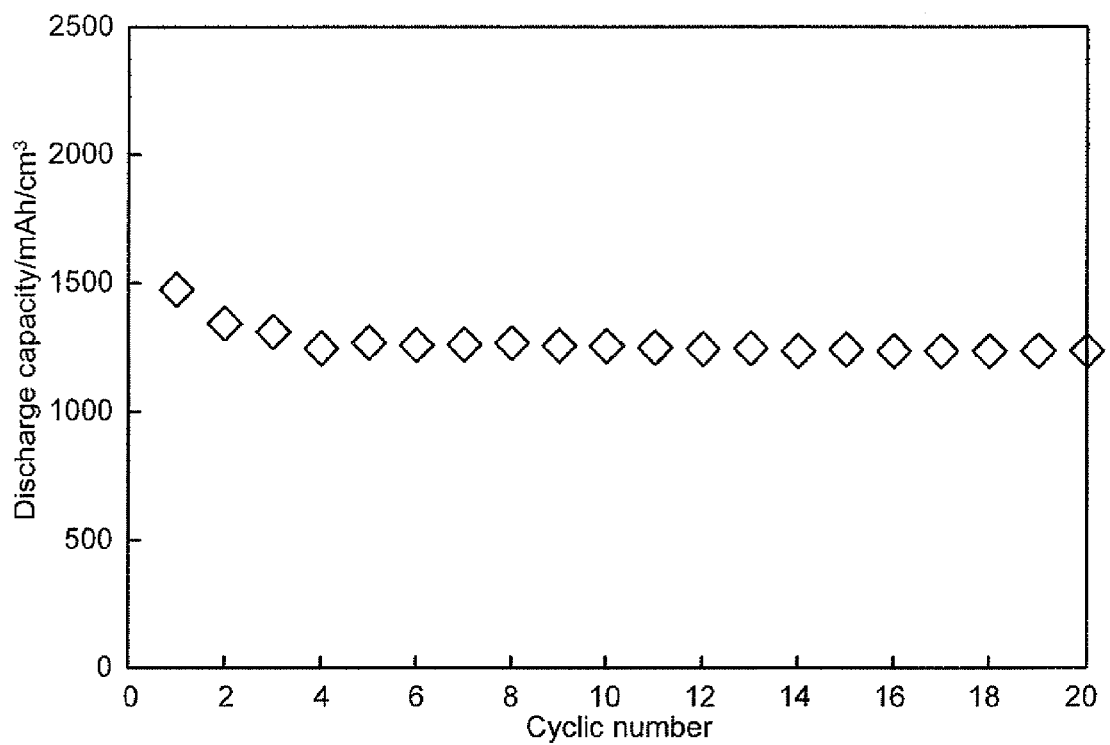
FIG. 17 is a cycling characteristic of the lithium-ion battery in Example.

FIG. 16 is a cycling characteristic of the lithium-ion battery having the negative electrode made of the 64.5 mass % tin nanoparticle-supported air-sac-like carbon nanostructure and the opposite electrode made of the lithium disc. FIG. 17 is a cycling characteristic of the lithium-ion battery having the negative electrode made of the 64.5 mass % tin nanoparticle and 5 mass % copper-supported air-sac-like carbon nanostructure and the opposite electrode made of the lithium disc.

Normally, if the tin particle is directly employed as the negative electrode active material, the negative electrode active material is subject to electric isolation due to the break and slip thereof originated from the volume expansion thereof at the initial discharge so that the lithium-ion secondary battery containing the negative electrode active material can exhibit only low discharge capacity. Moreover, if the charge/discharge process is repeated, the negative electrode active material is severely subject to the electric isolation so that the lithium-ion secondary battery containing the negative electrode active material can exhibit only lowest discharge capacity after some charge/discharge process.

Referring to FIGS. 16 and 17, the lithium-ion secondary battery can exhibit excellent cyclic characteristic because it is considered that the carbon of the carbon nanostructure has a large contact area with the metallic material so that the conducting path can be formed in the tin as the active material and the slip and break of the tin can be prevented since the tin is closed in the pores of the carbon nanostructure.

In comparison of the graph illustrated in FIG. 16 with the graph illustrated in FIG. 17, the lithium-ion secondary battery made of the 64.5 mass % tin nanoparticle and 5 mass % copper-supported air-sac-like carbon nanostructure can exhibit better cycling characteristic than that of the lithium-ion battery having the negative electrode made of the 64.5 mass % tin nanoparticle-supported air-sac-like carbon nanostructure. This is because the volume expansion of the tin-copper alloy as the active material is much relaxed since the tin-copper with a small volume expansion is supported.

Example 6

Support of Silicon in Pore

The carbon nanostructure encapsulating the silicon tetrachloride instead of the tin chloride was prepared in the same manner as the aforementioned Example, and the tetrahydofuran solution containing 1M-lithium triethylborohydride (trade name: Superhydride) was used as a reducing agent. As a result, supporting ratio of about 50% was able to be realized.

Figure 18:
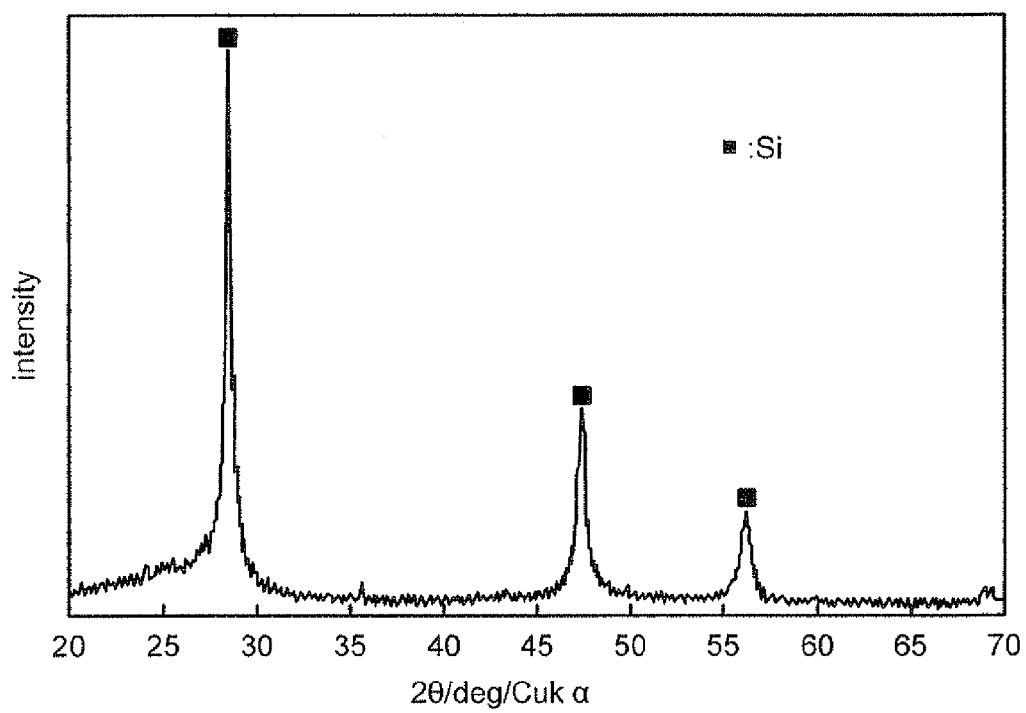
FIG. 18 is an X-ray diffraction spectrum of a silicon-supported carbon nanostructure in Examples.

FIG. 18 is an X-ray diffraction spectrum of the thus obtained silicon-supported carbon nanostructure. As is apparent from FIG. 18, some peaks relating to silicon (Si) can be apparently recognized. Therefore, the silicon supported in the pores forms no silicon compound and exists as it is, which means the silicon is singly supported in the pores.

Example 7

Charge/Discharge Characteristic of Silicon-Supported Negative Electrode

First of all, 85 parts by mass of the tin-supported carbon nanostructure (negative electrode active material) obtained in Example 6, 5 part by mass of Ketjen Black (conducting agent) and 10 parts by mass of PVDF (binder) were prepared and dispersed in NMP to form a slurry. The thus obtained slurry was coated in a weight of 4.0 mg and a diameter of 14 mm on an electrolytic copper foil with a thickness of 18 μm, dried and press-molded to form a negative electrode plate. Then, the negative electrode plate was punched out by a circular punch with a diameter of 14 mm, and dried at a temperature of 120° C. for 6 hours under vacuum atmosphere to form a negative electrode.

Then, the metallic lithium as the positive electrode (opposite electrode) and the electrolytic solution made by dissolving $LiPF_6$ at a concentration of 1 mol/L into the mixed solvent made of ethylene carbonate (EC) of 30 vol % and diethyl carbonate (DEC) of 70 vol % were prepared in addition to the negative electrode, and the intended coin nonaqueous electrolytic lithium-ion secondary battery (CR2025 type) was fabricated in a dry box. The fabrication of the battery was conducted by laminating the positive electrode and the negative electrode via a polypropylene separator, closing and sealing them with the electrolytic solution.

As the evaluation for the lithium-ion secondary battery, the initial discharge capacity and the latter discharge capacity after the cyclic charging/discharging process were measured.

The measurement of the initial discharge capacity was conducted as follows: Namely, constant-current charge was conducted up to 0.01 V and constant-voltage charge was conducted up to 10 μA or less while constant-current discharge was conducted up to 3.0 V. The cyclic charging/discharging process was conducted in the same manner as described above per cycle.

Figure 19:
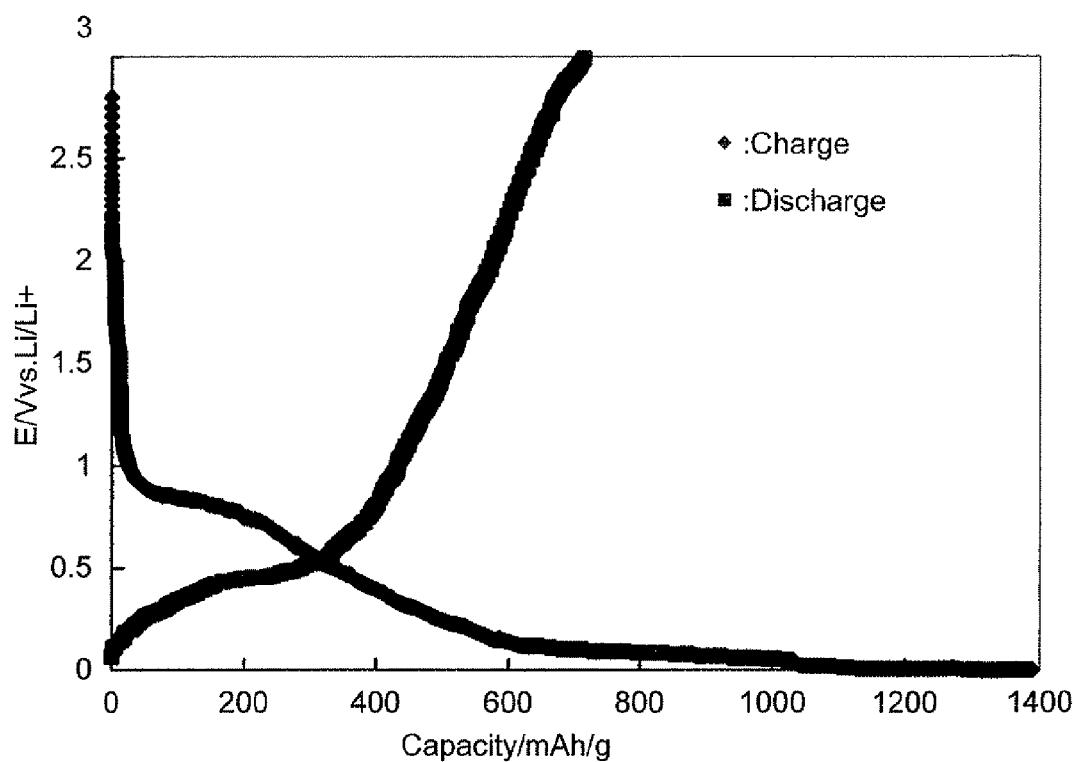
FIG. 19 is a charge/discharge curve of a lithium-ion battery in Example.

FIG. 19 is a charge/discharge curve of the lithium-ion battery having the negative electrode made of the 48.0 mass % silicon nanoparticle-supported air-sac-like carbon nanostructure and the opposite electrode made of a lithium disc. It is turned out that the initial discharge capacity, which is estimated from FIG. 19, is 714 mAh/g. Therefore, the lithium-ion secondary battery containing the aforementioned negative electrode can exhibit high capacity retention in comparison with the initial discharge capacity (372 mAh/g) of the lithium-ion secondary battery containing the negative electrode made of the carbon nanostructure.

Figure 20:
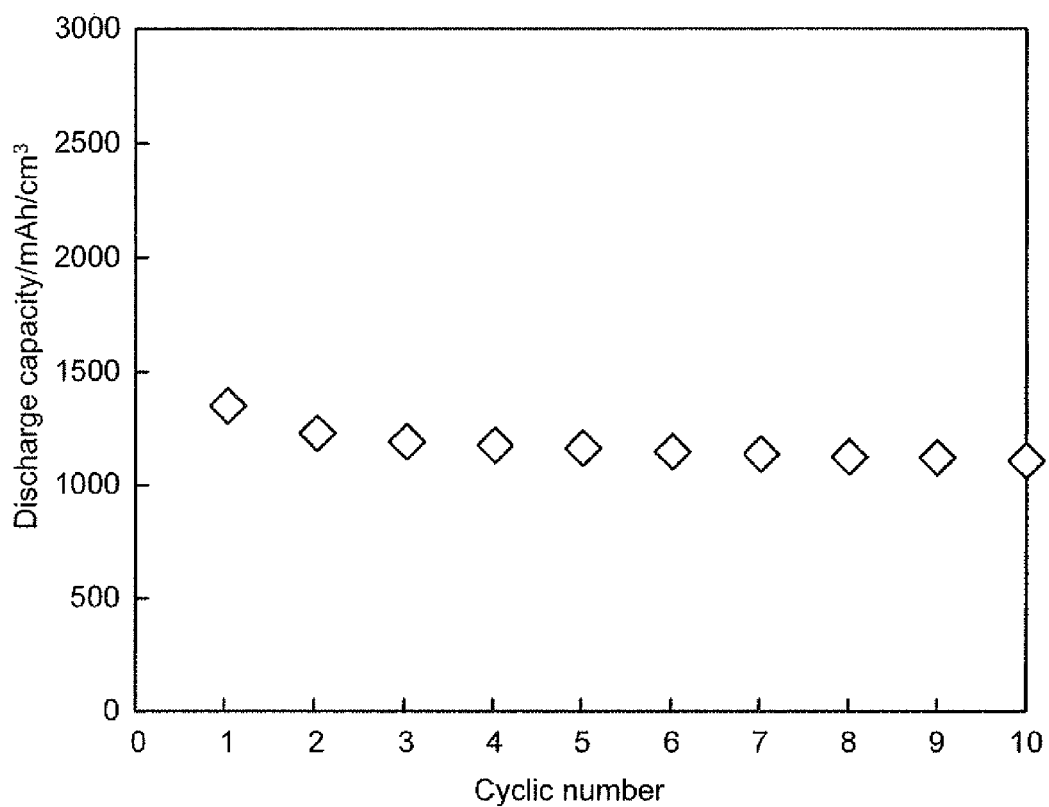
FIG. 20 is a cycling characteristic of the lithium-ion battery in Example.

FIG. 20 is a cycling characteristic of the lithium-ion battery having the negative electrode made of the 48.0 mass % tin nanoparticle-supported air-sac-like carbon nanostructure and the opposite electrode made of the lithium disc.

Normally, if the silicon particle is directly employed as the negative electrode active material, the negative electrode active material is subject to electric isolation due to the break and slip thereof originated from the volume expansion thereof at the initial discharge so that the lithium-ion secondary battery containing the negative electrode active material can exhibit only low discharge capacity. Moreover, if the charge/discharge process is repeated, the negative electrode active material is severely subject to the electric isolation so that the lithium-ion secondary battery containing the negative electrode active material can exhibit only lowest discharge capacity after some charge/discharge process.

Referring to FIG. 20, on the other hand, the lithium-ion secondary battery containing the supported silicon can exhibit excellent cycling characteristic. This is because the break of the active material due to the volume change at charge/discharge process can be prevented by reducing the size of the metallic material to be supported and the contact area between the metallic material and the carbon of the carbon nanostructure is increased originated from the three-dimensional contact therebetween so that the conducting path can be formed for the silicon as the active material and the slip and break of the silicon can be prevented.

Although the present invention was described in detail with reference to the above examples, this invention is not limited to the above disclosure and every kind of variation and modification may be made without departing from the scope of the present invention.

What is claimed is:

1. A metal-supported carbon nanostructure comprising:
    a carbon nanostructure including carbon containing rod-shaped materials and/or carbon containing sheet-shaped materials which are bound three-dimensionally, and graphene multilayer membrane walls which are formed in the rod-shaped materials and/or the sheet-shaped materials, wherein air-sac-like pores, which are defined by the graphene multilayer membrane walls and made of adjacent pores communicated with one another and defined by three to ten-layered graphene multilayer membrane walls, are formed in the rod-shaped materials and/or the sheet-shaped materials; and
    a metallic material supported in the air-sac-like pores,
    wherein the air-sac-like pores include first pores, each having a pore diameter within a range of 1 to 20 nm and second pores, each having a pore diameter within a range of 10 to 80 nm.

2. The metal-supported carbon nanostructure as set forth in claim 1,
    wherein the metallic material contains at least one selected from the group consisting of Si, Ge, Sn, In, Sb and Zn.

3. The metal-supported carbon nanostructure as set forth in claim 1,
    wherein the carbon nano structure is a three-dimensional net-like monolith so that the metal-supported carbon nanostructure is a three-dimensional net-like monolith.

4. The metal-supported carbon nanostructure as set forth in claim 1,
    wherein the metallic material is partially supported in the first pores and/or the second pores at least under the condition that the supported size of the metallic material is smaller than the pore diameters of the first pores and the second pores.

5. A lithium-ion secondary battery comprising a metal-supported carbon nanostructure as set forth in claim 1 as a negative electrode.

6. A method for producing a carbon nanostructure, comprising the steps of:
    blowing methyl acetylene gas into a solution containing a metallic salt to form rod-shaped crystalline materials and/or sheet-shaped crystalline materials of metallic methyl acetylide;
    conducting first thermal treatment for the rod-shaped crystalline materials and/or sheet-shaped crystalline materials to segregate metal of the metallic methyl acetylide and carbon of the rod-shaped crystalline materials and/or sheet-shaped crystalline materials so as to form carbon nanostructure intermediate which is configured such that carbon containing rod-shaped materials and/or sheet-shaped materials are bound three-dimensionally and then form metal encapsulated carbon nanostructure which encapsulates the metal in the carbon nanostructure intermediate;

contacting the metal encapsulated carbon nanostructure with nitric acid; and conducting second thermal treatment for the metal encapsulated carbon nanostructure to blow off metal encapsulated in the metal encapsulated carbon nanostructure.

7. The producing method as set forth in claim 6, wherein the first thermal treatment is conducted under vacuum atmosphere.

8. The producing method as set forth in claim 6, further comprising the step of washing the metal encapsulated carbon nanostructure after the metal encapsulated in the metal encapsulated carbon nanostructure is blown off to dissolve and remove metal remaining in the metal encapsulated carbon nanostructure.

9. The producing method as set forth in claim 6, further comprising the step of conducting third thermal treatment for the metal encapsulated carbon nanostructure after the metal encapsulated in the metal encapsulated carbon nanostructure is blown off to remove metal remaining in the metal encapsulated carbon nanostructure.

10. A method for producing a metal supported carbon nanostructure, comprising the steps of:

blowing methyl acetylene gas into a solution containing a metallic salt to form rod-shaped crystalline materials and/or sheet-shaped crystalline materials of metallic methyl acetylide;

conducting first thermal treatment for the rod-shaped crystalline materials and/or sheet-shaped crystalline materials to segregate metal of the metallic methyl acetylide and carbon of the rod-shaped crystalline materials and/or sheet-shaped crystalline materials so as to form a carbon nanostructure intermediate which is configured such that carbon containing rod-shaped materials and/or sheet-shaped materials are bound three-dimensionally and then form metal encapsulated carbon nanostructure which encapsulates the metal in the carbon nanostructure intermediate;

contacting the metal encapsulated carbon nanostructure with nitric acid and conducting second thermal treatment for the metal encapsulated carbon nanostructure to blow off the metal encapsulated in the metal encapsulated carbon nanostructure so as to form a carbon nanostructure including carbon containing rod-shaped materials and/or carbon containing sheet-shaped materials which are bound three-dimensionally, and graphene multilayer membrane walls which are formed in the rod-shaped materials and/or the sheet-shaped materials, wherein air-sac-like pores, which are defined by the graphene multilayer membrane walls, are formed in the rod-shaped materials and/or the sheet-shaped materials;

preparing a solution containing metallic chloride and mixing the carbon nanostructure with the solution so as to seal the metallic chloride in the air-sac-like pores of the carbon nanostructure through desolvating treatment; and conducting dechlorinating treatment for the metallic chloride to precipitate and support metal of the metallic chloride in the air-sac-like pores.

11. The producing method as set forth in claim 10, wherein the first thermal treatment is conducted under vacuum atmosphere.

12. The producing method as set forth in claim 10, further comprising the step of washing the metal encapsulated carbon nanostructure after the metal encapsulated in the metal encapsulated carbon nanostructure is blown off to dissolve and remove metal remaining in the metal encapsulated carbon nanostructure.

13. The producing method as set forth in claim 10, further comprising the step of conducting third thermal treatment for the metal encapsulated carbon nanostructure after the metal encapsulated in the metal encapsulated carbon nanostructure is blown off to remove the metal remaining in the metal encapsulated carbon nanostructure.

* * * * *